United States Patent [19]

Miller et al.

[11] Patent Number: 5,771,116
[45] Date of Patent: Jun. 23, 1998

[54] MULTIPLE BIAS LEVEL RESET WAVEFORM FOR ENHANCED DMD CONTROL

[75] Inventors: Rodney Miller, Frisco; Richard Gale, Richardson; Harian Paul Cleveland, Garland; Mark L. Burton, Dallas, all of Tex.

[73] Assignee: Texas Instruments Incorporated, Dallas, Tex.

[21] Appl. No.: 729,664

[22] Filed: Oct. 21, 1996

[51] Int. Cl.⁶ .................................................. G02B 26/00
[52] U.S. Cl. ........................ 359/295; 359/212; 359/291
[58] Field of Search .................................. 359/290, 291, 359/292, 293, 294, 295, 212, 213, 214

[56] References Cited

U.S. PATENT DOCUMENTS

| | | | |
|---|---|---|---|
| 5,061,049 | 10/1991 | Hornbeck | 359/224 |
| 5,079,544 | 1/1992 | DeMond et al. | 340/701 |
| 5,105,369 | 4/1992 | Nelson | 364/525 |
| 5,278,652 | 1/1994 | Urbanus et al. | 358/160 |
| 5,444,566 | 8/1995 | Gale et al. | 359/291 |
| 5,535,047 | 7/1996 | Hornbeck | 359/295 |

*Primary Examiner*—Georgia Y. Epps
*Assistant Examiner*—Dawn-Marie Bey
*Attorney, Agent, or Firm*—Charles A. Brill; James C. Kesterson; Richard L. Donaldson

[57] ABSTRACT

A DMD spatial light modulator (20) having an improved reset waveform (80) that improves the electrostatic control over the DMD mirrors (30) during switching states (T3). An intermediate bias level is provided to the yoke (32) and mirror (30) during the mirror reset cycle (T3) which is sufficient to maintain a voltage differential between the mirror/yoke and the address electrodes (26,28,50,52) to dynamically park the mirror during a same-state transition, but which voltage differential is insufficient to overcome the hinge restoration forces during an opposite-state transition such that the mirror releases toward the neutral position and can be captured in the other state upon reapplication of the bias voltage. The transition bias level is maintained for a sufficient time period (T3) to allow the mirror/yoke to release from the landing pads (82) a sufficient distance toward the neutral position. The operating reliability of the device is improved by preventing incident light during same-state mirror transitions from escaping into the display aperture, without impeding the crossover of the mirror during opposite-state mirror transitions. Greater mirror-to-mirror variations can be tolerated without falling outside the mirror arrays acceptable timing operating parameters.

8 Claims, 4 Drawing Sheets

MULTIPLE BIAS LEVEL RESET WAVEFORM FOR ENHANCED DMD CONTROL

TECHNICAL FIELD OF THE INVENTION

The present invention is generally related to spatial light modulators for modulating incident light to form an optical light image, and more particularly, to a digital micromirror device (DMD) implementing a reset waveform that improves the electrostatic control over the DMD mirrors during switching states.

BACKGROUND OF THE INVENTION

Spatial Light Modulators (SLMs) have found numerous applications in the areas of optical information processing, projection displays, video and graphics monitors, televisions, and electrophotographic printing. SLMs are devices that modulate incident light in a spatial pattern to form a light image corresponding to an electrical or optical input. The incident light may be modulated in its phase, intensity, polarization, or direction. The light modulation may be achieved by a variety of materials exhibiting various electro-optic or magneto-optic effects, and by materials that modulate light by surface deformation.

An SLM is typically comprised of an area or linear array of addressable picture elements (pixels). Source pixel data is first formatted by an associated control circuit, usually external to the SLM, and then loaded into the pixel array one frame at a time. This pixel data may be written to the pixel array using a variety of algorithms, i.e. sequentially top-to-bottom one pixel line at a time, interleaving by sequentially addressing top-to-bottom ever other pixel line, such as the odd rows of pixels, and then returning to address the even pixel lines, etc. In cathode ray tubes (CRTs), this data writing technique is know as rasterizing, whereby a high powered electron gun scans across the pixel elements of a phosphor screen left to right, one line at a time. This pixel address data writing scheme is equally applicable to liquid crystal displays (LCDs) as well.

A recent innovation of Texas Instruments Incorporated of Dallas Tex., is the digital micromirror device or the deformable mirror device (collectively DMD). The DMD is an electro/mechanical/optical SLM suitable for use in displays, projectors and hard copy printers. The DMD is a monolithic single-chip integrated circuit SLM, comprised of a high density array of 16 micron square movable micromirrors on 17 micron centers. These mirrors are fabricated over address circuitry including an array of SRAM cells and address electrodes. Each mirror forms one pixel of the DMD array and is bistable, that is to say, stable in one of two positions, wherein a source of light directed upon the mirror array will be reflected in one of two directions. In one stable "on" mirror position, incident light to that mirror will be reflected to a projector lens and focused on a display screen or a photosensitive element of a printer. In the other "off" mirror position, light directed on the mirror will be deflected to a light absorber. Each mirror of the array is individually controlled to either direct incident light into the projector lens, or to the light absorber. The projector lens ultimately focuses and magnifies the modulated light from the pixel mirrors onto a display screen and produce an image in the case of a display. If each pixel mirror of the DMD array is in the "on" position, the displayed image will be an array of bright pixels.

For a more detailed discussion of the DMD device and uses, cross reference is made to U.S. Pat. No. 5,061,049 to Hornbeck, entitled "Spatial Light Modulator and Method"; U.S. Pat. No. 5,079,544 to DeMond, et al, entitled "Standard Independent Digitized Video System"; and U.S. Pat. No. 5,105,369 to Nelson, entitled "Printing System Exposure Module Alignment Method and Apparatus of Manufacture", each patent being assigned to the same assignee of the present invention and the teachings of each are incorporated herein by reference. Gray scale of the pixels forming the image is achieved by pulse-width modulation techniques of the mirrors, such as that described in U.S. Pat. No. 5,278,652, entitled "DMD Architecture and Timing for Use in a Pulse-Width Modulated Display System", assigned to the same assignee of the present invention, and the teachings of which are incorporated herein by reference.

Evolutionary changes to the DMD superstructure and the reset schemes for controlling mirror switching have resulted in a system architecture that is optimized to maximize optical performance while maintaining adequate reset margin against stiction. Stiction is the tendency for the mirror or yoke to adhere to the landing pad when mirror release is initiated. To optimize optical performance, a hidden hinge superstructure was developed that increases mirror reflectivity while in the latched state. Such a hidden hinge superstructure is disclosed in commonly assigned co-pending patent application Ser. No. 08/424,021 entitled "Active Yoke Hidden Hinge Digital Micromirror Device", the teachings of which are incorporated herein by reference. Large hinge restoring forces are provided to overcome the increased mass of this superstructure, these hinge restoring forces also assisting in overcoming variations or limitations in the passivation layer on the landing pad that might lead to mirror/yoke stiction. The superstructure combination of large mass and large hinge restoring forces has resulted in a decreased ability to control the mirror during reset.

In previous DMD designs, such as disclosed in commonly assigned U.S. Pat. No. 5,444,566 to Gale, et al., entitled "Optimized Electronic Operation of Digital Micromirror Devices", the mirror bias is removed during device reset whereby the mirrors are released from the prior deflected state and move toward the neutral or flat position due to the reduced electrostatic attraction forces. If mirror bias is not timely reapplied, the kinetic energy released by the hinge restoring force will cause the mirrors to oscillate about the neutral (flat) position for approximately 50 microseconds. When the mirror device is allowed to operated in this manner, each oscillation may cause the mirror to reflect light into the display aperture, resulting in a reduction of the apparent contrast ratio. Since mirror oscillations about the neutral position can result in an unacceptable degradation in contrast ratio, one prior reset scheme employs a "catch-on-the-fly" approach, shown graphically in FIG. 15 of the '566 patent. The catch-on-the-fly reset approach prevents any mirror oscillations from occurring by allowing the mirror/yoke to release from the landing pad and then reapplying mirror bias immediately after reset, in time to recapture same-state mirror transitions before the mirror reaches the neutral position, but not before opposite-state mirror transitions can escape for mirror capture on the opposite side of neutral.

The catch-on-the-fly reset scheme requires very critical timing parameters to correctly operate all the mirrors across the device. Referring to FIG. 1, there is shown that very little differential exists in mirror release velocities between same-state and opposite-state transitions. The release velocity of a same-state transition is generally shown at 10, wherein the release velocity for an opposite-state transition is generally shown at 12. The voltage potential at a first address electrode for a same-state transition is shown at 14, with the voltage potential for the first address electrode for an opposite-state transition being shown at 16. Only a very narrow time window exists for the timely reapplication of mirror bias 18 to successfully recapture same-state mirror transitions while allowing for the escape and capture of opposite-state mirror transitions. Process variations or aging differences from mirror to mirror can cause one or more of the mirrors to be sent to the incorrect state, commonly referred to as an address margin failure. The allowable time window for reapplying mirror bias continues to narrow as the device ages, causing many mirrors with slight mechanical differences to be defects due to address margin failure.

Accordingly, there is desired an improved reset waveform that improves the electrostatic control over the DMD mirrors during switching states. This new improved reset waveform should prevent same-state mirror transitions from escaping and allowing the mirror to reflect light into the display aperture, without impeding the crossover of opposite-state mirror transitions. In addition, the new improved reset waveform should provide improved lifetime operating reliability of the DMD device.

SUMMARY OF THE INVENTION

The present invention achieves technical advantages as a DMD spatial light modulator having an improved reset waveform that latches a mirror (dynamic parking) during same-state transitions, but allows the escape of the mirror toward the neutral position for opposite-state transitions. This is achieved by implementing a mirror bias reset waveform having an intermediate voltage during reset that establishes a sufficient voltage differential between the mirror and one address electrode to dynamically latch the mirror during same-state transitions, but which voltage differential is insufficient to latch the mirror during opposite-state transitions thereby allowing the mirror to release toward the neutral position. Mirror bias is then reestablished. This approach of keeping mirrors latched during the same-state transitions provides for large separation between the two transition velocities, and thus significantly lowers the dependence on critical timing parameters for reapplication of mirror bias. This approach also reduces the chance for the mirror to inadvertently reflect incident light into the display aperture. The lifetime reliability of the device is enhanced, and greater mirror to mirror variations can be tolerated without falling outside the mirror arrays acceptable timing operating parameters.

The present invention comprises a spatial light modulator having a first and second address electrode having a first voltage and a second voltage applied thereto, respectively. A deflectable element is supported over these address electrodes. The element is deflectable between a first state and a second state as a function of a voltage differential between the element and the address electrodes. A circuit applies a third voltage to the element to latch the element in either of the first state or the second state. This circuit also selectively applies a fourth voltage to the element that is sufficient to maintain the element in the first state when the first voltage to the first address electrode is maintained, but which fourth voltage is insufficient to maintain the element in the first state when the first voltage is changed to reduce the voltage differential between the element and the first address electrode. To cause the element to transition from the first state to the second state, the first voltage and the second voltage applied to the address electrodes is exchanged to cause a greater differential between the mirror and the second address electrode, preferably before the third voltage is applied to the element. Preferably, the circuit reapplies the third voltage to the element a predetermined period after applying the fourth voltage, causing the element to assume the second state since the voltage differential between the element and the second address electrode is greater than the voltage differential between the element and first address electrode. Preferably, the element is a micromirror supported by a hinge over the address electrodes.

A method of operating the digital micromirror device comprises the steps of first applying a voltage potential to a first and second address electrode underlying an element deflectable between a first state and a second state. A first voltage is applied to the first address electrode, and the second voltage is applied to the second address electrode. Next, a third voltage is applied to the deflectable element to create a voltage differential between the element and the first address electrode. Thereafter, a fourth voltage is applied to the deflectable element during a reset cycle which is sufficient to retain the element in the first state when the first voltage is maintained to the first address electrode, but which fourth voltage is insufficient to retain the element in the first state when the first voltage to the first address electrode is changed to reduce the voltage differential between the element and first address electrode. Summarizing, to establish a state transition of the element, the differential between the first address electrode and the element is reduced, and then the fourth voltage applied to the deflectable element, allowing the element to escape towards the other address electrode for opposite-state transitions.

The third voltage is reapplied to the deflectable element a predetermined time after applying the fourth voltage, causing the deflectable element to assume the second state when the voltage differential between the element and the second address electrode is greater than the voltage differential between the element and the first address electrode. However, if the voltage differential between the first address electrode and the element is maintained, the element remains in the first state. Preferably, before applying the fourth voltage to the deflectable element, the third voltage is alternatingly applied to the deflectable element at a frequency corresponding to the resonant frequency of the deflectable element. Generally, the fourth voltage is approximately halfway between the third voltage and the first voltage.

By applying an intermediate fourth voltage to the deflectable element during the element reset cycle, a sufficient voltage differential (attractive force) is established to overcome hinge restoration forces and maintain a latched element during same-state transitions, but which fourth is insufficient to latch the element during opposite-state transitions, and allows the element to escape toward neutral and later be latched in the second state. The present invention greatly enhances the reliability of the device, and greater mirror to mirror variations can be tolerated without falling outside the mirror arrays acceptable timing operating parameters.

DETAILED DESCRIPTION OF THE PREFERRED EMBODIMENT

Figure 2:
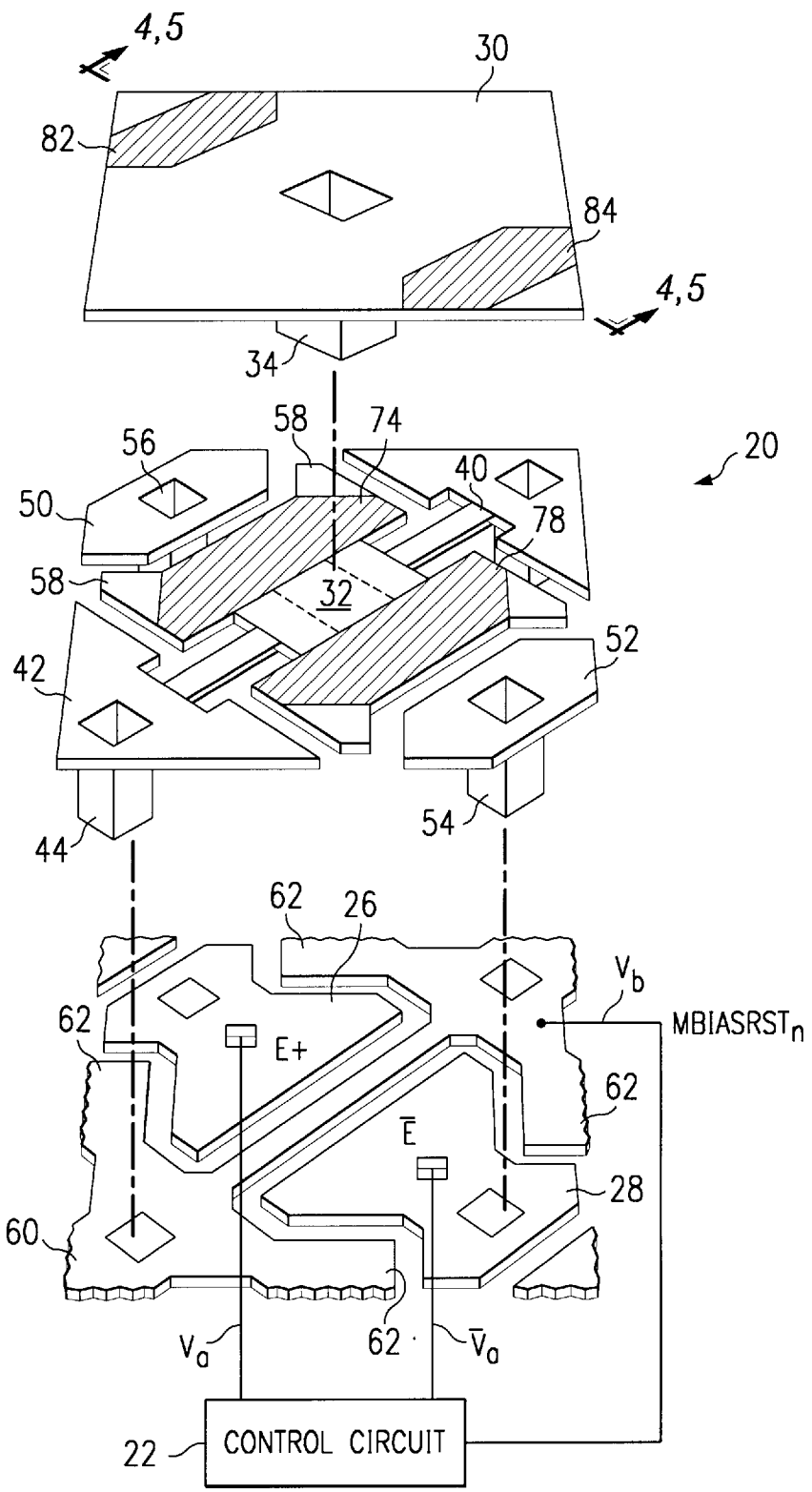
FIG. 2 is an exploded perspective view of one DMD pixel of a pixel array, including an elevated mirror fabricated upon a deflectable yoke, the yoke in turn being supported by a pair of hinges, the hashed portions illustrating the region of electrostatic attraction between the elevated mirror and an elevated address electrode, and between the yoke and the underlying address electrode upon the substrate.

Referring now to FIG. 2, one pixel 20 of a mirror array is shown. The data of a secondary memory cell of control circuit 22 is provided to a pair of complementary address electrode lines identified as $V_a$ and $\overline{V}_a$, each line in turn being connected to one of two address electrodes 26 and 28 fabricated under and associated one or more pixels 20 of the array. Pixel 20 is seen to include a square mirror 30 supported upon and elevated above a yoke generally shown at 32 by a support post 34. Support post 34 extends downward from the center of the mirror, and is attached to the center of the yoke 32 along a torsion axis thereof, as shown, to balance the center of mass of mirror 30 upon yoke 32. Yoke 32 has a generally butterfly shape and is axially supported along a central axis thereof by a pair of torsion hinges 40. The other end of each torsion hinge 40 is attached to and supported by a hinge support post cap 42 defined on top of a respective hinge support post 44. A pair of elevated mirror address electrodes 50 and 52 are supported by a respective address support post 54 and 56.

The address support post 54 and 56, and the hinge support posts 44, support the address electrodes 50 and 52, the torsion hinges 40, and the yoke 32 away from and above a bias/reset bus 60 and the pair of substrate level address electrode pads 26 and 28. When mirror 30 and yoke 32 are together rotated about the torsion axis of the yoke, defined by the hinges 40, a pair of yoke tips 58 on the side of the yoke 32 that is deflected land upon and engage the bias/reset bus 60 at the landing sites 62.

Figure 5:
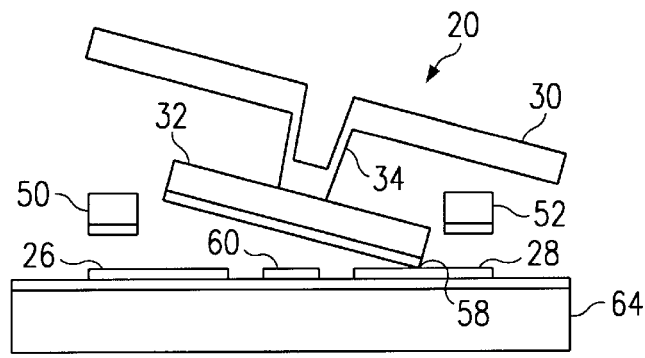
FIG. 5 is a cross-sectional view of one pixel of the DMD array in the neutral position, illustrating the elevated mirror address electrodes and the yoke supported over a pair of substrate address electrodes.
Figure 6:
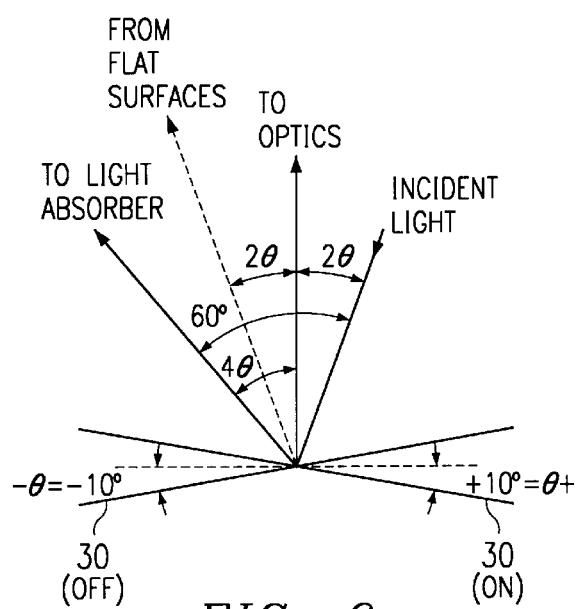
FIG. 6 is also a cross-sectional view of one pixel such as that of FIG. 5, with the yoke and the mirror supported thereon together being rotated to one stable state, whereby the yoke tips land upon a pair of respective landing pads, while the elevated mirror remains proximate but spaced from the elevated mirror address electrodes.

Pixel 20 is bistable whereby rotation of mirror 30 and yoke 32 can be achieved in one of two directions, to modulate incident light as shown in FIG. 5 and FIG. 6 and will be discussed shortly. An address voltage is selectively provided by control circuit 22 via electrode line $V_a$ or $\overline{V}_a$ to one of the two address electrode pads 26 or 28, and one of the corresponding elevated mirror address electrodes 50 or 52 via the associated electrode support post 54 and 56, with the complement voltage being provided to the non-addressed electrode pad. This address voltage may be 0 volts with the complement voltage being +7 volts, but could also comprise other levels if desired. At the same time, a bias voltage is selectively provided by control circuit 22 to the bias/reset bus 60, and thus to yoke 32 via support post 44, post caps 42 and hinges 50, as well as to mirror 30 via support 34, according to the preferred embodiment of the present invention and will be discussed in more detail shortly in view of FIG. 7.

Figure 1:
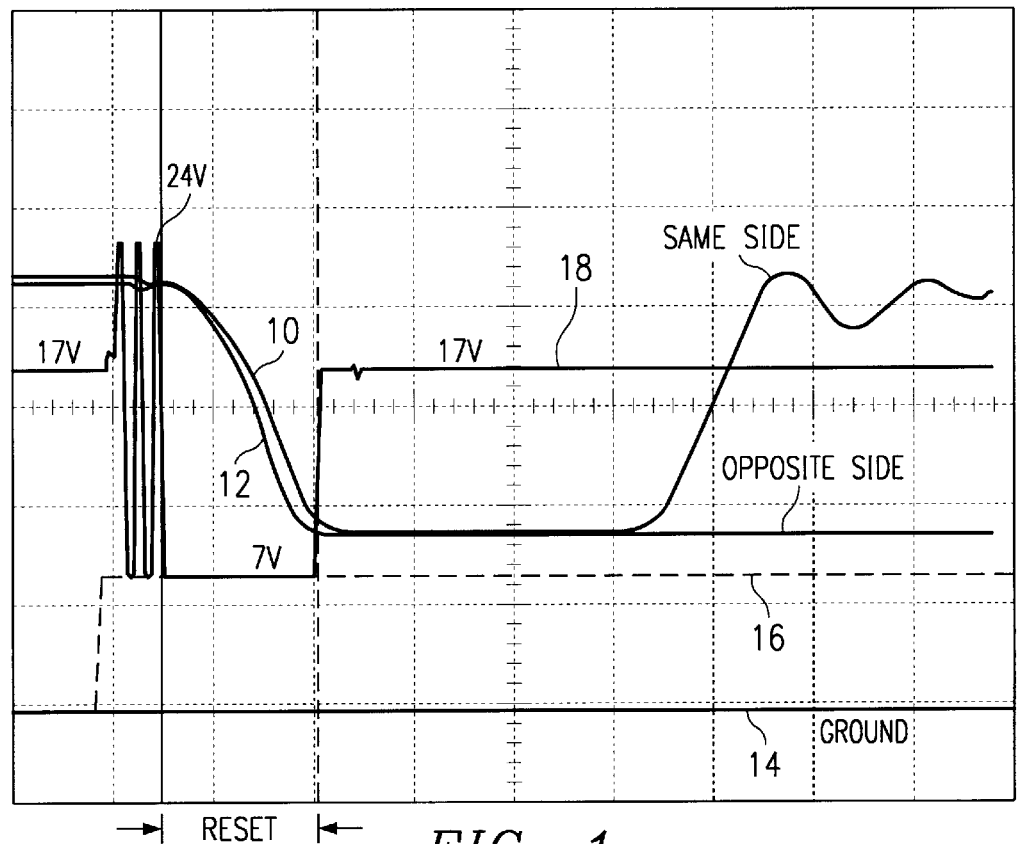
FIG. 1 is a graph illustrating the angular velocity of a prior art deflectable mirror for both a same-state transition, and an opposite-state transition, illustrating the very small angular separation when the mirror is also permitted to release from a landing electrode during the same-state transition, whereby the mirror bias voltage during reset is equal to the maximum voltage of the address electrodes during an opposite-state transition to create no voltage differential between the mirror and one electrode.
Figure 3:
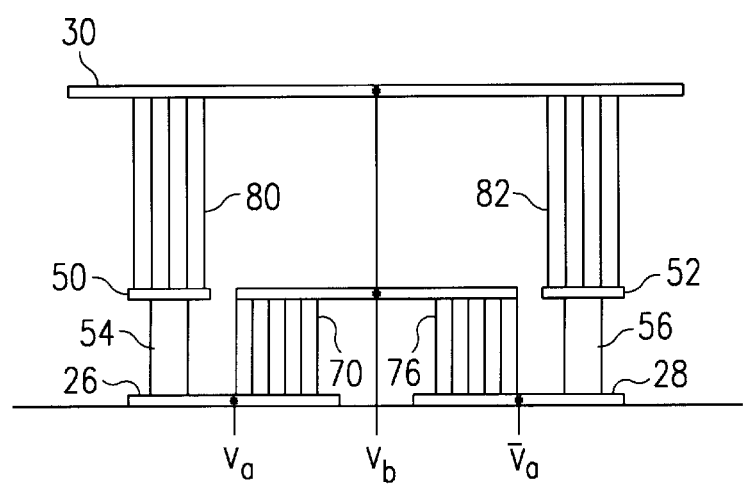
FIG. 3 is an illustration of the electrostatic attraction forces between the mirror and the elevated address electrode, and between the yoke and the underlying address electrode, the yoke and mirror being electrically connected to a bias/reset bus and having the same voltage bias.

Referring to FIG. 3, the electrostatic attraction forces achieved between elevated mirror 30 and the elevated electrodes 50 and 52, as well as between yoke 32 and the address pads 26 and 28, are shown. The location of these attractive forces are illustrated by the hatched areas 74,78,82 and 84 in FIG. 2.

Figure 4:
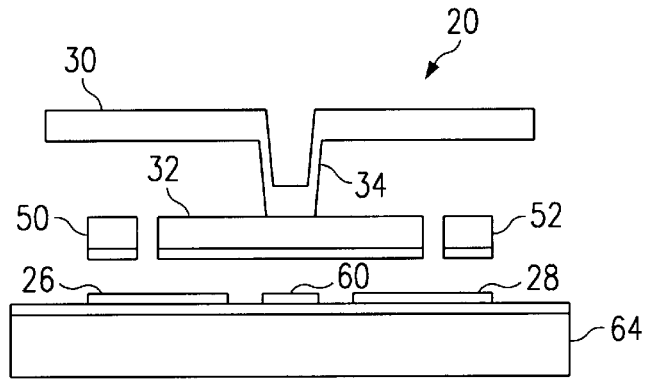
FIG. 4 is an illustration of the two stable deflectable states of the pixel mirror shown in FIG. 2 for deflecting incident light in one of two directions.

Referring now to FIG. 4, pixel 20 in an undeflected (flat) state is shown. Referring to FIG. 5, by way of example, if mirror 30 and yoke 32 are to be rotated clockwise, a 0 volt potential is provided by circuit 22 on address line $\overline{V}_a$ to address electrode 28 and elevated electrode 52 while a complementary voltage potential of +7 volts is provided on address line $V_a$ to address electrode 26 and elevated electrode 50. A bias potential is selectively provided on the bias line $V_b$ to the bias/reset bus 60 to provide a bias potential on yoke 32 and mirror 30. This bias potential is normally +24 volts during a non-transition period, although other potentials can be established if desired. An electrostatic attraction force from the 24 volts differential generated between the address electrode 28 and a portion of the yoke 32, this force being generally shown at 76 in FIG. 3, and the electrostatic attraction force from the 24 volt differential between the elevated electrode 52 and mirror 30, shown generally at 82 in FIG. 3, causes rotation of pixel 20 as shown in FIG. 6. The corresponding portion of yoke 32 that overhangs the addressed electrode 28 is shown by the hatched portion illustrated at 78 in FIG. 2. Conversely, if the mirror was to be rotated in a counterclockwise direction, a 0 volt potential would be provided on the address electrode 26 to generate an attractive force at 70, with a corresponding portion of the yoke 32 overhanging address electrode 26 being shown by the hatched region at 74. A +7 volt potential would be provided on address electrode 28.

Referring now to FIG. 6, an optical schematic diagram is shown whereby incident light is seen to be modulated and deflected in one of two directions, depending on whether the mirror is in the "on" or "off" state. When mirror 30 is in the "on" state, incident light is reflected to optics including a projector lens, and ultimately focused upon a display screen in the case of a front or rear screen projector, or focused upon a photosensitive surface in the case of an electrophotographic printer. When mirror 30 is in the "off" position, incident light is reflected to a light absorber and away from the darkfield optics. A 20 degree rotation between the bistable states of mirror 30 achieves a 40 degree swing of reflective incident light. The present invention achieves a high contrast ratio spatial light image, which is critical for use in darkfield optics systems for which the spatial light modulator of the present invention is intended.

Figure 7:
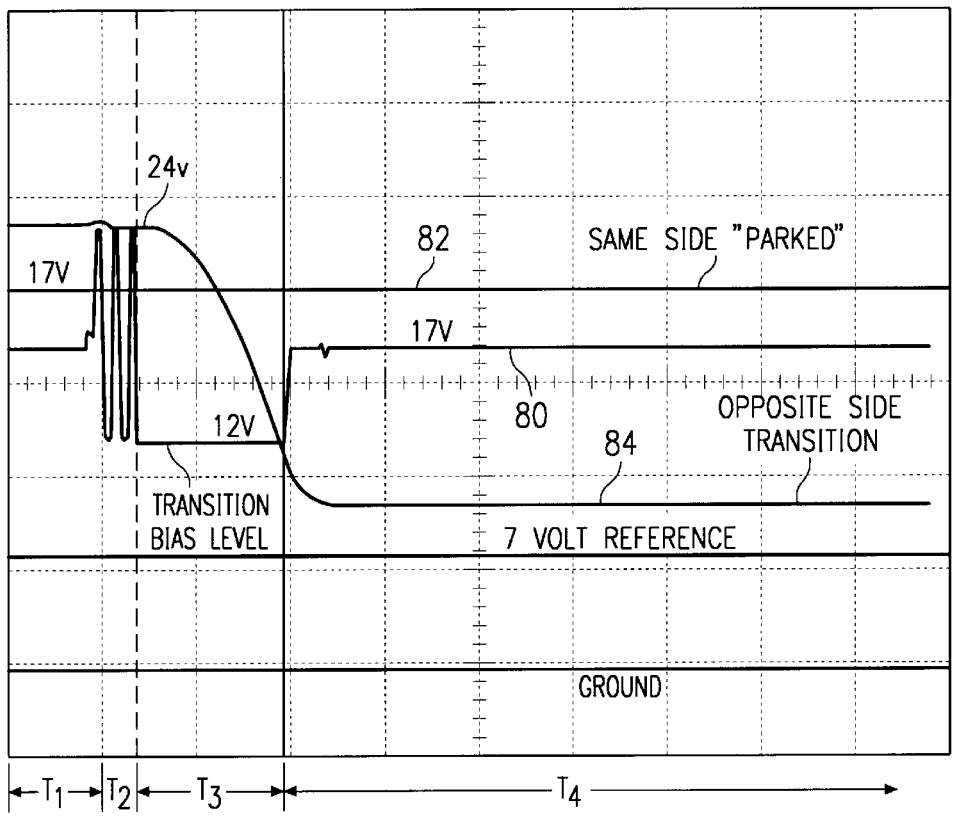
FIG. 7 is a graph of the improved reset waveform that biases the yoke and mirror, whereby a transition bias level is established during a reset cycle such that the mirror/yoke never leaves the first state and remains parked during a same-state transition, yet which mirror is released toward neutral for opposite-state transitions.

Referring now to FIG. 7, according to the preferred embodiment of the present invention, an improved reset waveform is implemented during a reset cycle that improves the electrostatic control over the DMD mirrors 30 during switching states. This is achieved by providing a transition bias level to the yoke and mirror during the reset cycle that is an intermediate voltage between the maximum address electrode voltage (+7 volts) and the normal bias voltage (+17 volts). This intermediate voltage level, preferably being +12 volts as shown, insures that the mirrors 30 remained latched during same-state transitions, but which transition bias level is not sufficient to prevent the escape of the mirror from the landing pads for opposite-state transitions.

Still referring to FIG. 7, during time period identified as $T_1$, a bias/reset waveform 80 is established by control circuit 22 to have a potential of +17 volts. Referring back to FIG. 5, for purposes of illustration and clarity, it will be assumed that the mirror 30 and yoke 32 are rotated as shown in the clockwise direction and the mirror is in the "on-state", as shown in FIG. 6. The voltage potential to address electrode 28 is 0 volts, while the voltage potential applied to the complement address electrode 26 is +7 volts. Thus, a voltage potential between the yoke 32 and mirror 30 in reference to address electrode 28 and elevated electrode 52, respectively, is 17 volts (17–0). The voltage differential between the yoke 32 and the mirror 30 in reference to the other address electrode 26 and elevated electrode 50, respectively, is only 10 volts, (17–7). Thus, mirror 30 is shown in a stable latched state.

Referring back to FIG. 7, during time period identified as $T_2$, the potential of the bias/reset waveform 80 is alternated for 3 cycles between +24 volts and +12 volts at a frequency of about 2.9 megahertz, which is the resonant frequency of hinges 40, being about 2.9 megahertz. A more detailed discussion of applying the resonant reset pulse is disclosed in commonly assigned U.S. Pat. No. 5,285,196 entitled "Bistable DMD Addressing Method", the teachings of which are incorporated herein by reference. Essentially, applying a resonant reset pulse for 2 or 3 cycles helps the mirror to resonate and become free from the landing pads and overcome any stiction forces that may exist.

During mirror reset time period identified as $T_3$, according to the preferred embodiment of the present invention, the bias/reset waveform 80 is established at an intermediate transition bias level, shown as +12 volts. This reset bias level is intermediate the normal +17 volt bias level and the maximum +7 volt address electrode voltage. For a same-state mirror transition, mirror 30 never leaves the "on" state, shown in FIG. 5 and FIG. 6, and graphically shown at 82 in FIG. 7. In other words, the mirror 30 remains dynamically parked. For opposite-state transitions, however, that is where the address voltages to address electrodes 26 and 28 are switched such that a 0 volt potential is provided to address electrode 26 and a +7 volt potential is provided to address electrode 28, the intermediate bias level of +12 volts permits mirror 30/yoke 32 to release from the landing electrodes 82 and an opposite-state transition is permitted, shown graphically at 84.

During same-state transitions, that is, when the mirror remains dynamically parked and the yoke 32 remains in contact with the landing electrodes 82, a 12 volt (12 volts–0 volts) differential exists between the mirror 30, yoke 32 and the corresponding electrodes and creates an attractive force shown at 76 and 82 in FIG. 3. This voltage potential is sufficient to create the attractive forces 76 and 82 which overcome the restoring force of the hinges 40, and the mirror remains dynamically parked for same-state transitions shown in FIG. 5 and graphically in FIG. 7. This chosen intermediate bias level is dependent on the stiffness of the hinges, that is, the stiffer the hinges the greater the voltage potential needed to overcome the hinge restoring force. In addition, the greater the initial velocity of the mirror/yoke leaving the landing electrode, the greater the needed intermediate bias level to ensure the mirror remains dynamically parked for same-state transitions. The greater the peak voltage, and the greater the number of pulses of the reset waveform during time period $T_2$, the greater the initial velocity of the mirror/yoke.

For opposite-state transitions, that is, whereby the voltage potentials to the address electrodes 26 and 28 are exchanged during time period $T_3$, there exists between mirror 30 and yoke 32 and the corresponding address electrodes 28 only a 5 volt potential (12 volts–7 volts), which voltage potential is insufficient to create electrostatic attraction forces that can overcome the hinge restoration forces. Consequently, the yoke 32 releases from the landing pads 82 toward the neutral position during time period $T_3$. At the start of a time period identified as $T_4$, the +17 bias is reapplied to yoke 32 and mirror 30, as shown, causing the opposite-state transition to conclude whereby yoke 32 is pulled toward and contacts landing pads 82, and along with mirror 30 is latched over address electrode 26.

Figure 8:
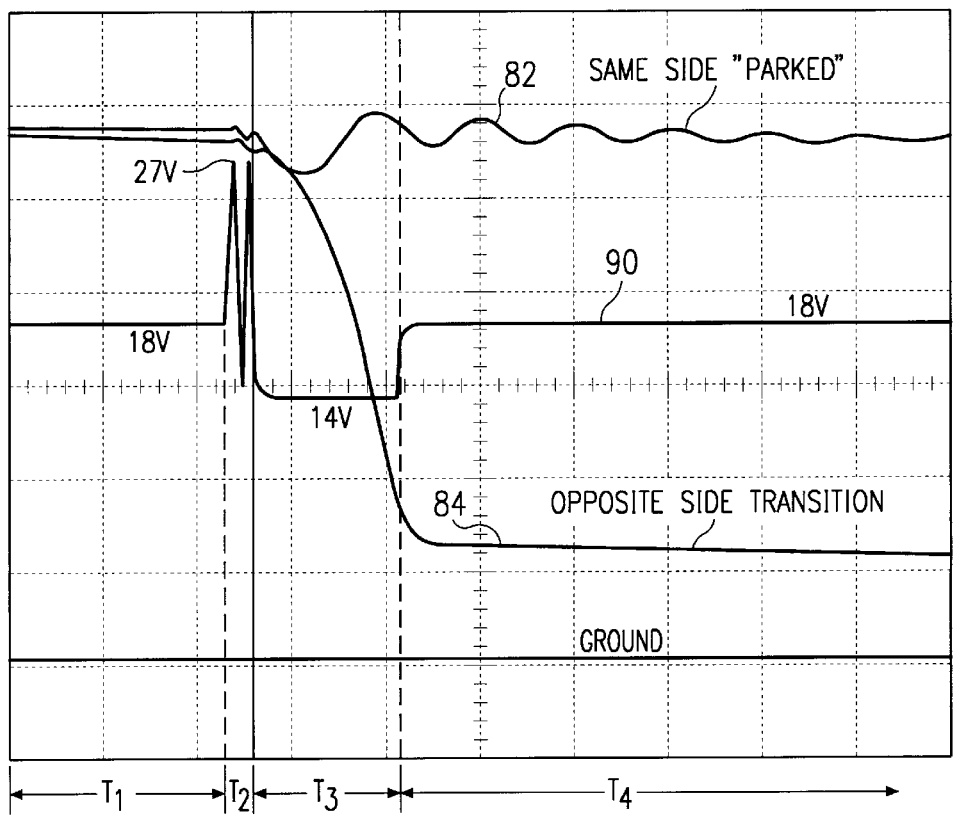
FIG. 8 is a graph of yet another improved reset waveform with slightly different voltages, whereby only two reset pulses are utilized during period $T_2$.

Referring now to FIG. 8, there is shown another improved reset waveform at 90 whereby only two reset pulses are utilized during reset period $T_2$. The peak voltage of the reset pulses is +27 volts, with the normal bias voltage during period $T_1$ being about +18 volts, and the intermediate bias voltage during period $T_3$ being about +14 volts. Although only two pulses are applied during period $T_2$, the +27 volt potential, along with other hinge parameters including hinge stiffness, creates a slightly greater initial velocity of the mirror/yoke leaving the landing electrodes. Hence, a slightly greater +14 volt intermediate bias voltage is utilized during period $T_3$ as compared to the waveform 80 in FIG. 7. As illustrated, the chosen intermediate bias voltage is dependent on several factors, but is approximately half-way between the normal mirror bias voltage and the maximum address electrode voltage.

A principle feature of the present invention is that during the bias/reset period identified at $T_3$, an intermediate transition bias level is maintained on yoke 32 and mirror 30 that is sufficient to create an electrostatic attractive force due to a differential voltage between the address electrodes and the yoke/mirror that overcomes the hinge restoration forces to ensure the mirror remains dynamically parked during a same-state transition. However, this intermediate transition bias level creates insufficient attractive forces needed to overcome the hinge restoration forces when the address voltages to the address electrodes are interchanged during an opposite-state transition, and the mirror/yoke is permitted to release from the landing pads toward the neutral (flat) position. A sufficient address margin is maintained with the transition bias level whereby the mirror/yoke will not inadvertently release from the landing pads and inadvertently be captured in an opposite state during a same-state transition. Since the mirror/yoke never leaves the landing pads during a same-state transition, which was permitted using the "catch-on-the-fly" approach, the mirror does not escape and cause incident light to be reflected into the display aperture. Moreover, the timing constraints for reapplying the 17 volt bias potential is not as critical. The DMD lifetime reliability is improved, and greater mirror-to-mirror variations can be tolerated without falling outside the mirror arrays acceptable timing operating parameters.

While a +17 volt bias potential is preferably implemented in the present invention with a +12 volt transition bias level, with the maximum address electrode potential being +7 volts, other bias and address potentials can be implemented as well, and limitation to these preferred values are not to be inferred. Rather, the differential voltages established during same-state and opposite-state transitions are critical. Preferably, the transition bias level (+12 volts) approximately between the normal bias potential (+17 volts) and the maximum address electrode potential (+7 volts). A minimum differential voltage is necessary during the reset cycle to ensure that the mirror/yoke remains dynamically parked during same-state transitions, this differential potential being about 12 volts (12 volts–0 volts). Other transition bias levels and address voltages can be used to establish differential voltages that overcome the hinge restoration forces during a same-state transition, and limitation to +12 volts as a transition bias level is not to be inferred. In the present invention, a range of 0.5 microseconds to 6 microseconds for time period $T_3$ is used to permit the mirror/yoke to release from the landing pads toward the neutral position such that it can be subsequently captured in the other state when the +17 volt bias potential is reapplied to the yoke/mirror during period $T_4$.

Though the invention has been described with respect to a specific preferred embodiment, many variation and modifications will become apparent to those skilled in the art upon reading the present application. It is therefore the intention that the appended claims be interpreted as broadly as possible in view of the prior art to include all such variations and modifications.

We claim:

1. A method of operating a spatial light modulator comprising the steps of:
   (a) applying a voltage to a first and second address electrode underlying an element defectble between a first state and second state, wherein a first voltage is applied to said first address electrode and a second voltage is applied to said second address electrode;
   (b) applying a third voltage to said deflectable element to create a voltage differential between said element and said first address electrode and between said element and said second address electrode; and
   (c) applying a fourth voltage to said deflectable element during a reset cycle which is sufficient to retain said element in said first state when said first voltage is maintained to said first address electrode, but which said fourth voltage is insufficient to retain said element in said first state when said voltage differential between said element and said first address electrode is less than said voltage differential between said element and said second address electrode.

2. The method as specified in claim 1, further comprising the step of:
   (d) reapplying said third voltage to said deflectable element a predetermined period after applying said fourth voltage to cause said deflectable element to assume said second state when said voltage differential between said element and said second address electrode is greater than said voltage differential between said element and said first address electrode.

3. The method as specified in claim 1, further comprising the step of: before said step c), alternating said third voltage applied to said deflectable element at a frequency corresponding to the resonant frequency of said deflectable element.

4. The method as specified in claim 1 wherein said fourth voltage is approximately halfway between said third voltage and said first voltage.

5. A method of operating a spatial light modulator comprising the steps of:
   (a) applying a voltage to a first address electrode underlying an element deflectable between a first state and second state, wherein a first voltage is applied to said first address electrode;
   (b) applying a third voltage to said deflectable element to create a voltage differential between said element and said first address electrode; and
   (c) applying a fourth voltage to said deflectable element during a reset cycle which is sufficient to retain said element in said first state when said first voltage is maintained to said first address electrode, but which said fourth voltage is insufficient to retain said element in said first state when said first voltage is removed from said first address electrode and applied to said second address electrode.

6. A spatial light modulator, comprising:
   (a) a first and second address electrode having a first voltage and a second voltage applied thereto, respectively;
   (b) a deflectable element supported over said address electrodes, said element being deflectable between a first state and a second state as a function of a voltage differential between said element and said address electrodes; and
   (c) a circuit applying a third voltage to said element to latch said element in said first state when a first voltage differential between said first address electrode and said element exceeds a second voltage differential between said second address electrode and said element, and in said second state when said second voltage differential exceeds said first voltage differential, said circuit selectively applying a fourth voltage to said element sufficient to maintain said element in said first state when said first voltage differential exceeds said second voltage differential, but which said fourth voltage is insufficient to maintain said element in said first state when said second voltage differential exceeds said first voltage differential.

7. The spatial light modulator as specified in claim 6, wherein said circuit reapplies said third voltage to said element a predetermined period after applying said fourth voltage, whereby said element assumes said second state when said voltage differential between said element and said second address electrode is greater than said voltage differential between said element and said first address electrode.

8. The spatial light modulator as specified in claim 6 wherein said element is a micromirror supported by a hinge over said address electrodes.

* * * * *

UNITED STATES PATENT AND TRADEMARK OFFICE
CERTIFICATE OF CORRECTION

PATENT NO.   : 5,771,116
DATED        : June 23, 1998
INVENTOR(S)  : Rodney Miller, Richard Gale, Harlan Paul Cleveland, Mark L. Burton It is certified that error appears in the above-indentified patent and that said Letters Patent is hereby corrected as shown below:

Cover Page, Col. 1, line [75] Inventors, change    "Rodney Miller, Frisco; Richard Gale, Richardson; Harian Paul Cleveland, Garland; Mark L. Burton, Dallas, all of Tex."

to    --Rodney Miller, Frisco; Richard Gale, Richardson; Harlan Paul Cleveland, Garland; Mark L. Burton, Dallas, all of Tex.--

Signed and Sealed this

Sixth Day of October, 1998

Attest:

Attesting Officer

BRUCE LEHMAN
*Commissioner of Patents and Trademarks*